United States Patent [19]

Ryan

[11] Patent Number: 4,584,803
[45] Date of Patent: Apr. 29, 1986

[54] HIGH STRENGTH CELLULAR METAL FLOOR RACEWAY SYSTEM

[75] Inventor: Thomas G. Ryan, Bethel Park, Pa.

[73] Assignee: Cyclops Corporation, Pittsburgh, Pa.

[21] Appl. No.: 628,292

[22] Filed: Jul. 5, 1984

[51] Int. Cl.$^4$ .............................................. E04B 5/48
[52] U.S. Cl. ....................................... 52/221; 52/334
[58] Field of Search ................. 52/221, 220, 323, 334,
52/336; 174/48, 49

[56] References Cited

U.S. PATENT DOCUMENTS

| | | | |
|---|---|---|---|
| 2,729,429 | 1/1956 | Goemann | 52/221 |
| 2,877,990 | 3/1959 | Goemann | 52/221 |
| 2,912,848 | 11/1959 | Lee et al. | 52/221 |
| 3,181,277 | 5/1965 | Slingluff | 52/221 |
| 3,264,791 | 8/1966 | Hudson | 52/221 |
| 3,596,421 | 8/1971 | Miller | 52/334 X |
| 3,720,029 | 3/1973 | Curran | 52/334 |
| 3,793,793 | 2/1974 | Dobbins | 52/221 |
| 3,812,636 | 5/1974 | Albrecht et al. | 52/334 |
| 3,849,957 | 11/1974 | Bastgen | 52/334 X |
| 3,851,674 | 12/1974 | Fork | 138/173 |
| 3,886,702 | 6/1975 | Fork | 52/221 |
| 4,030,259 | 6/1977 | Meckler | 52/221 |
| 4,194,332 | 3/1980 | Fork | 52/220 |
| 4,232,493 | 11/1980 | Gray et al. | 52/221 |
| 4,338,484 | 7/1982 | Littrell | 174/48 |

OTHER PUBLICATIONS

Cyclops Corporation brochure entitled "Smith Wireway 3".

Primary Examiner—J. Karl Bell
Attorney, Agent, or Firm—Buell, Ziesenheim, Beck & Alstadt

[57] ABSTRACT

An improved high strength cellular metal floor raceway system for distribution of service lines and the like is disclosed. Deck members are provided on upper and lower levels and present at least one uninterrupted deck conduit extending substantially horizontally on both deck levels. The deck conduit extends transversely with respect to one or more longitudinally extending beams which support the deck members. A feeder member having at least one uninterrupted feeder conduit therein extending substantially parallel with respect to the supporting beams is at least partially recessed within the upper deck level above the lower deck level. An upper surface of the feeder member is preferably provided on substantially the same vertical level as an upper surface of the upper deck level. A layer of concrete is provided over substantially the entire surface area of the conduit system. The combined or composite action of the beams, deck members and overlying concrete slab provides greater strength than prior art structures. The upper finished concrete surface provides an unobstructed, unrestricted fully utilized floor surface.

16 Claims, 3 Drawing Figures

HIGH STRENGTH CELLULAR METAL FLOOR RACEWAY SYSTEM

This invention relates to an improved cellular metal floor raceway system for use in the distribution of electrical, communication and other service lines and the like. More specifically, feeder conduit means which distribute service lines away from one or more main distribution closets are at least partially recessed within deck means. The deck means provide further distribution of the service lines in a direction transverse to that of the feeder conduits. By recessing the feeder conduits within the deck, it is possible to provide an uninterrupted layer of concrete of substantially uniform thickness over substantially the entire floor surface. Increased strength is obtained by securing the overlying concrete to the supporting structural beams and to the raceway system.

Various structures and methods are known for the distribution of service lines and the like. Most known methods utilize a two-level system wherein a main feeder trench runs perpendicular to and completely above a single level raceway decking means. It has been proposed, for example, to provide a main feeder trench on top of an area covered by a number of raceway decking sheets. That type of trench, however, typically extends upwardly to the upper surface of the finished floor and requires the provision of metal covers to enclose the various service lines within the trench. Such a system is undesirable because the covers are often irregular making it difficult to level the covers with the upper surface of the remaining finished floor. It is also difficult to neatly attach floor coverings over both the covers and the remaining floor surface. Additionally, since access to the trench may be required, the floor space directly above the trench may only be used for limited purposes. As a result, such trenches are often located in corridors or hallways. Foot traffic above the trenches in such locations, however, generates undesired noise because the trench covers often bear irregularly on their supports.

Another disadvantage of trench type feeders is that they usually require a relatively thick layer of fire proofing beneath them to obtain acceptable fire ratings.

With the system described above, it is not possible to attach an uninterrupted layer of concrete to the underlying beams and girders in order to obtain the benefit of composite design at the location of the trench. A concrete slab may not be provided because the trench extends to the upper surface of the floor.

I have overcome the above-mentioned problems by providing a cellular raceway system in which conduit feeder means are at least partially recessed within conduit deck means. Because there is no trench which extends up to the upper surface of the floor, I may provide an uninterrupted layer of concrete of substantially uniform thickness over substantially the entire floor area. The uninterrupted layer has greater strength than a comparable slab which has channel portions or other interruptions removed therefrom. Additionally, a composite structure is obtained by securing the overlying concrete slab to the supporting structural beams and/or girders. This attachment has the effect of increasing the strength of the support framing of the floor.

I provide deck means having an uppermost surface which defines a substantially horizontal plane. At least one continuous deck conduit is provided within the deck means. Each deck conduit is comprised of two or more horizontally extending conduit portions provided on at least two vertically disposed levels. The deck conduit portions extend transversely with respect to at least one longitudinally extending supporting beam. Preferably, the deck means further comprises an upper deck level and lower deck level.

Feeder conduit means, at least partially recessed within the deck means, are also provided. At least one continuous feeder conduit is provided within the feeder means. The feeder conduit is disposed substantially horizontally and extends substantially parallel with respect to the longitudinally extendng deck conduit supporting beam. Preferably, the feeder means does not extend upwardly above the plane defined by the upper surface of the deck means in adjacent locations. Further, the feeder means are preferably supported by supporting structural girders and by a lower deck level.

I prefer to provide feeder conduits of varying modular lengths as required to suit the spacing of the deck conduits rather than one relatively large feeder conduit which extends substantially across the entire floor area.

I further provide a cellular raceway system with increased structural strength by effectively utilizing the composite action of the beams and girders, recessed feeder, deck means and attached overlying concrete slab. Furthermore, the uninterrupted overlying concrete slab provides increased structural strength by effectively utilizing its diaphragm action either compositely or non-compositely with the metal deck means and supporting beams. As used herein, diaphragm action is the ability of the substantially flat, horizontally disposed concrete slab member, as bounded by and attached to structural framing members, to resist horizontal racking or shear forces exerted on the framing members by external sources such as wind or earthquake loads.

I provide a cellular raceway system which does not limit or restrict the full utilization of floor space above the feeder means by eliminating the need for a feeder trench with removable cover plates which extend up to the finished floor. I further prefer to provide a cellular raceway system which allows for user access through the concrete slab at locations of vertical communication between upper feeder conduits and lower deck conduits and at locations of vertical communication between the upper and lower deck conduits. I provide the above-mentioned access through the use of a suitable fitting, insert, or housing of construction similar to that used to access and utilize the services of the deck conduits in a general floor area thereby providing the user full utilization of floor space.

I further provide a cellular raceway system which requires substantially less fireproofing beneath the feeder means than systems described above because the layer of concrete provided over the upper surface of the feeder means acts as an insulator.

Other advantages and features of the present invention will be understood more fully upon reference to the accompanying drawings in which I have shown certain present preferred embodiments of my invention.

Figure 2:
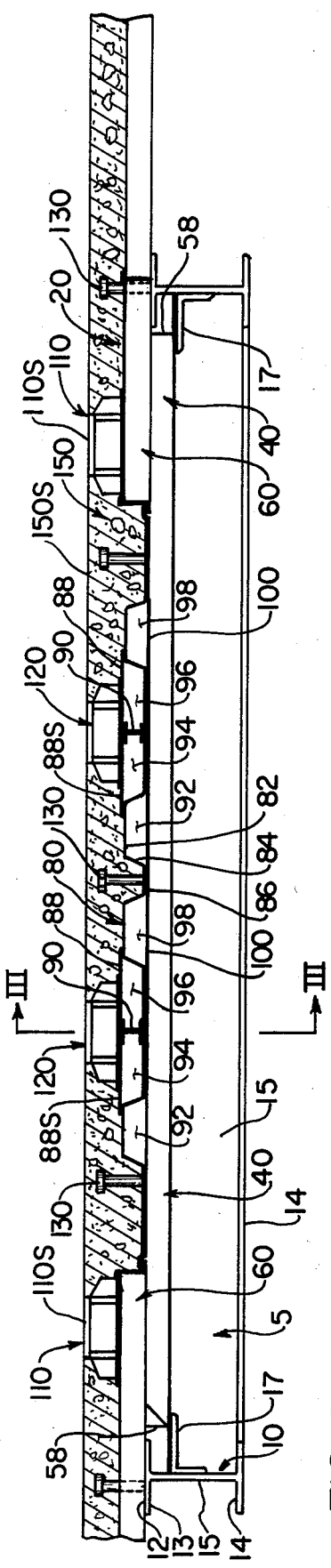
FIG. 2 is a cross sectional view of another embodiment of my raceway system similar to that shown in FIG. 1 but having an upper deck level on each side of feeder means.

The cellular metal raceway system according to the present invention is supported by at least one longitudinally extending beam or the like. In most steel supported buildings or structures, a plurality of spaced-apart parallel beams extend from one side of the structure to an opposite side. Typically, a plurality of transversely extending spaced-apart parallel girders are also provided to span the distance between adjacent pairs of beams to form a grid like pattern of beams and girders. Referring to the figures, beams 10 and girders 5 each have an uppermost surface 12, upper and lower flange portions 13 and 14 respectively, and a vertically oriented web portion 15. A longitudinally extending angle member 17 is secured to webbing portion 15 of selected beams 10 below upper surface 12 of such beams. Angles 17 are utilized to support a lower level 40 of deck means 20 (FIG. 2).

Figure 1:
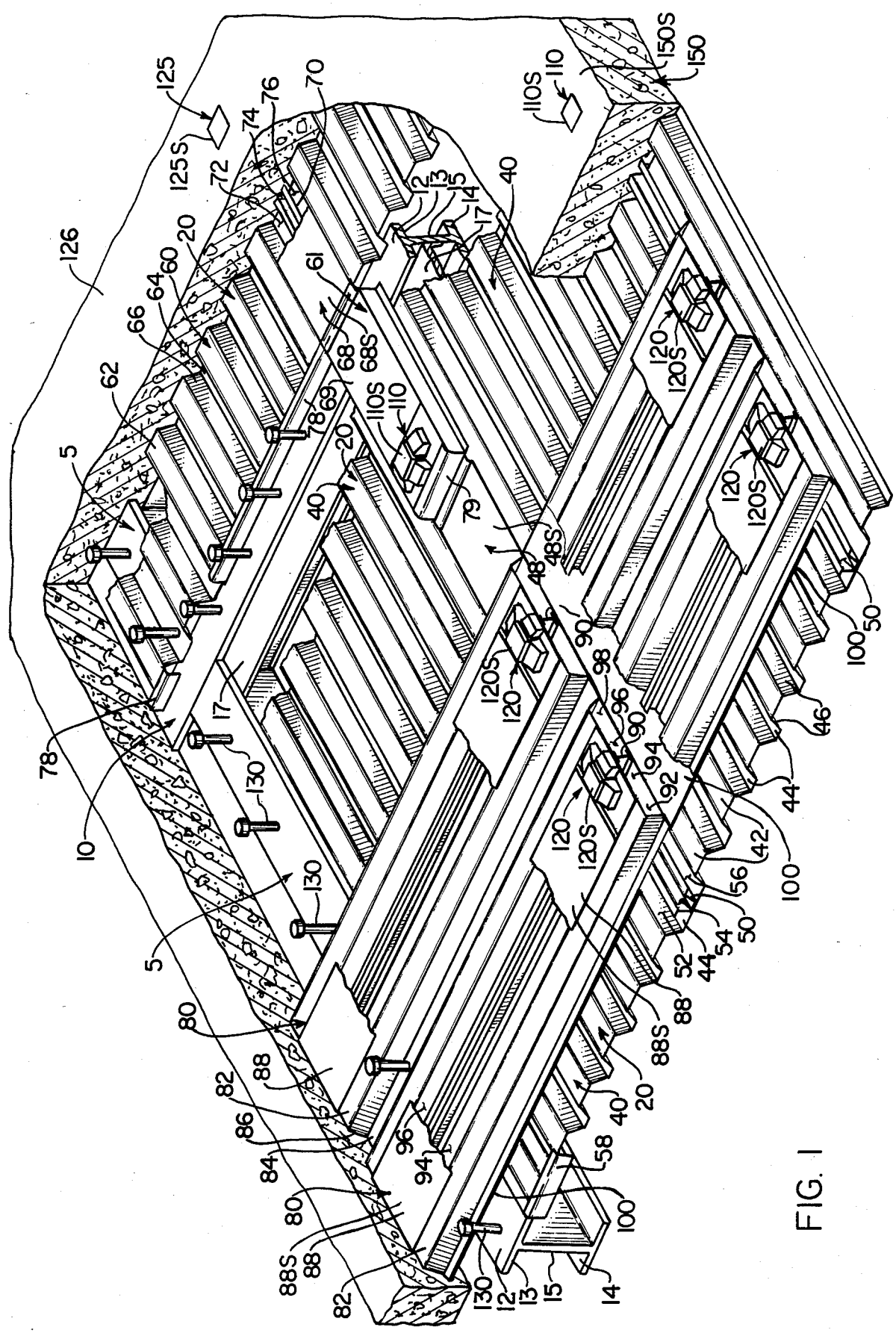
FIG. 1 is an isometric view of one embodiment of my cellular raceway system partially broken away to show deck means and feeder means as covered by an overlying layer of concrete.
Figure 3:
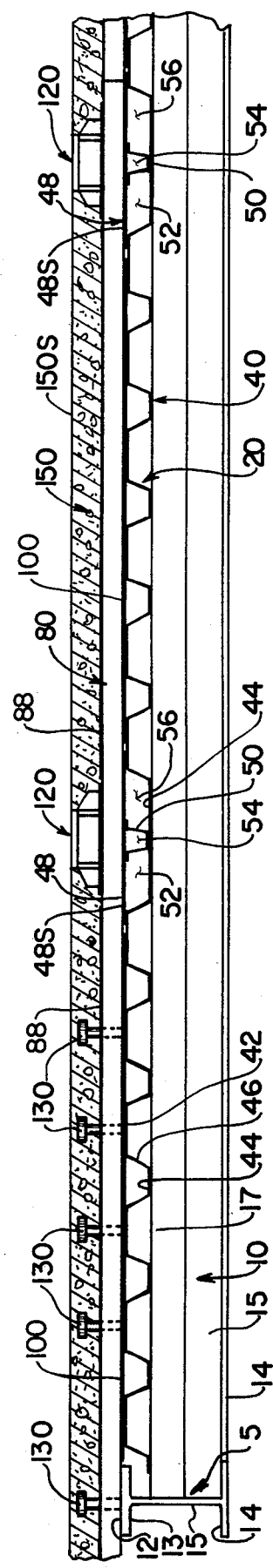
FIG. 3 is a cross sectional view taken generally on the line III—III of FIG. 2.

Deck 20 is comprised of an upper deck level 60 and lower deck level 40. Lower deck level 40 is supported on top of members 17 as best shown in FIG. 2. Deck level 40 is comprised of one or more corrugated metal sheets each having a plurality of spaced-apart crests 42, valleys 44 and intermediate webbing portions 46 therein. A suitable dividing member 50 may be placed into selected valleys 44 to separate the valley into two or more parallel conduits. Covers 48 are provided to enclose the conduits. Three such conduits 52, 54 and 56 are shown in FIGS. 1 and 3. Upper surface 48S of covers 48 is the uppermost surface of lower deck level 40. Surface 48S is preferably provided on the same vertical level or lower than upper surface 12 of beams 10 and girders 5.

Openings (not shown) are provided in covers 48 and deck level 60 to allow for vertical communication between lower deck conduits 52, 54 and 56 and corresponding upper deck conduits 72, 74 and 76 which are provided in upper deck level 60. Separation or isolation of services is preferred. Additional openings in covers 48 and feeder 80 allow for vertical communication between lower deck conduits 52, 54 and 56 and overlying feeder conduits 92, 94, 96 and 98 provided in feeder 80. To prevent unwanted flow of concrete from entering into lower deck conduits 52, 54 and 56, end cover plates 58 may be provided at each end of deck level 40. Additionally, continuous end cover plates 58 may be provided at each end of deck level 40 to prevent the unwanted flow of concrete into crests 42. Alternatively, crest portions may be provided with integrally closed ends. Rather than providing openings in cover 48, gaps may be provided between selected covers 48 to accomplish the same result.

As with the lower deck level 40, upper deck level 60 of deck 20 is comprised of corrugated metal sheets having a plurality of crests 62, valleys 64 and intermediate webbing portions 66 with covers 68 provided over selected valleys 64. A suitable dividing member 70 may be placed into the selected valleys to separate them into two or more enclosed parallel conduits. FIG. 1 shows three such conduits designated 72, 74 and 76. Upper surface 68S of covers 68 is the uppermost surface of deck level 60 and deck 20 and defines a substantially horizontal plane. Deck level 60 is supported by upper surface 12 of beams 10.

Extension members 61 to the upper deck level 60 may be provided on the ends of selected valleys 64 so that a portion of those valleys extend across beam 10 and are positioned directly above corresponding valleys 44 in the lower deck level. A cover 69 is provided over extension 61 which may also contain a suitable divider member (not shown). As mentioned above, some form of opening is provided in the extensions of the selected valleys 64 to allow for vertical communication between upper deck conduits 72, 74 and 76 and lower deck conduits 52, 54 and 56. End cover plates 78 and 79 are provided to prevent unwanted flow of concrete. Other end caps and barriers may be provided at various other locations to control the flow of concrete as desired.

Upper deck level 60 is typically formed of two or more spaced-apart corrugated metal sheet portions as shown in FIG. 2. Each of the corrugated sheets described above may contain a plurality of embossments on the webbing portions beween the crests and valleys to aid in securing an overlying concrete slab. In FIG. 2, the upper deck portions are spaced-apart so that feeder means 80 may be fully or partially recessed between the spaced-apart upper portions of deck 20. FIG. 1, on the other hand, shows deck 20 having a single upper deck portion 60 with feeder means 80 provided at one end thereof. With this arrangement, a feeder 80 may be provided along an outer wall of the structure rather than between upper deck sheet portions.

Three uninterrupted deck conduits are formed by communicating upper deck conduits 72, 74 and 76 and lower deck conduits 52, 54 and 56. These continuous deck conduits are disposed substantially horizontally and each conduit extends transversely with respect to beam 10.

Feeder 80 is preferably supported by girders 5 and by lower deck level 40. Feeder 80 extends longitudinally and is oriented substantially parallel with respect to beam 10. Feeder 80 may be formed of one or more corrugated sheets each having a plurality of spaced-apart crests 82, valleys 84 and intermediate webbing portions 86. A metal base sheet 100 is attached to the lower side of the corrugated sheets enclosing crest portions 82 and forming feeder conduits 92 and 98. Dividing members 90 may be provided in selected valleys 84 and cover sheets 88 may be placed over the corrugated sheets forming additional feeder conduits 94 and 96. The feeder conduits 92, 94, 96 and 98 all extend substantially parallel with respect to beam 10. The upper surface 88S of feeder covers 88 are preferably provided on the same vertical level as upper surface of 68S of upper deck level covers 68. Suitable openings are provided in base sheet 100 of feeder 80 and in covers 48 of lower deck level 40 to allow for communication between feeder conduits 92, 94, 96 and 98 and lower deck conduits 52, 54 and 56.

Access housings are provided at locations where communication between conduits occurs and where access to the services is desired. In the figures, access housings 120 are provided at locations where service lines may pass from feeder conduits 92, 94, 96 and 98 into lower deck conduits 52, 54 and 56. Additional access housings 110 are provided at locations where service lines pass from upper deck conduits 72, 74 and 76 to corresponding lower deck conduits 52, 54 and 56. In FIG. 1, the inner facing webbing portions 86 of crests 82 and portions of valleys 84 are removed between feeder conduits 92 and 94 and between 96 and 98 at the location immediately beneath access housings 120 to allow access to all feeder conduits from a single access housing. Additionally, the base sheet 100 of feeder 80 is set back at the location immediately beneath access housing 120 to allow access to all lower deck conduits from a single access housing. It is to be understood that access to both upper and lower deck conduits is provided by housings 110 and that access to both feeder and lower deck conduits is provided by housings 120. service fittings such as receptacles, connectors and the like may be provided in housings 110 and/or 120 and may be similar to fittings which may be provided in housings 125 of general floor area 126.

A plurality of studs 130 are secured at various locations on the upper surfaces 12 of beams 10 and girders 5. These studs are utilized at the user's option to secure an overlying layer of concrete to beams 10 and girders 5.

An uninterrupted slab or layer of concrete 150 of substantially uniform thickness is provided over substantially the entire surface area of the conduit system, thus increasing the overall strength of the floor system. A minimum thickness of at least two inches is preferred. The upper surface 150S of concrete layer 150 is preferably provided on substantially the same vertical level as upper surfaces 110S, 120S and 125S of access housings 110, 120 and 125. Therefore, the only locations on the floor surface over which less than two inches of concrete is provided are where access housings 110, 120 and 125 are provided. By securing layer 150 to the underlying beams 10 and girders 5 by means of studs 130, the overall strength of the floor is increased.

The function of my cellular metal raceway system is to provide an in-floor distribution system for service lines and the like which allows for the provision of an overlying layer of concrete of substantially uniform thickness thus providing substantially greater strength. A composite structure having greater strength than other known structures which provide in-floor distribution is provided by bonding the uniform concrete layer to the conduit and beam system.

Typically, feeder conduits are utilized to transport service lines from one or more main distribution closets in various directions across the floor area. The feeder may include any number of individual feeder conduits which may be provided in varying lengths. It is also contemplated that any single conduit may be divided into two or more smaller conduits by utilizing a separating or dividing means. The length, size and cross-sectional configurations of the individual conduits may vary depending on the specific use for which the conduit is designed. Some factors to be considered include the type and number of service lines each conduit must carry and the desired destination for each service line. Once the service lines have been transported away from the main closets by the feeder conduits, the underlying deck sheets are utilized to transport the service lines in a transverse direction to that provided by the feeder conduits.

It is also contemplated that the upper and lower deck levels may be formed as a single unit rather than as independent upper and lower levels. If corrugated sheets are used, however, independent upper and lower deck levels are preferred.

With the present invention, it is possible to provide a relatively thin layer of fireproofing material beneath the feeder means and still obtain an acceptable fire rating because the concrete layer acts as an insulator between the upper and lower floor surfaces. I prefer to provide a layer of fireproofing material of substantially uniform thickness beneath both the feeder means and the lower deck means.

While I have illustrated and described a present preferred embodiment of my invention, it is to be distinctly understood that the invention is not limited thereto and may be otherwise variously practiced within the scope of the following claims.

I claim:

1. A cellular flooring system for carrying electrical conductors and the like supported at least in part by spaced-apart longitudinally extending I-beams of the type having a horizontal upper flange, a horizontal lower flange and a vertical web connecting said upper and lower flanges comprising:
   (a) plural spaced-apart horizontally disposed upper corrugated deck means, each having at least one deck conduit therein extending transversely with respect to the spaced-apart beams, each upper deck means supported fully above the beams at least in part by the upper flanges of the beams and each upper deck means having an upper surface positioned in a common horizontal plane;
   (b) horizontally disposed lower corrugated deck means having at least one deck conduit therein extending transversely with respect to the beams, said lower deck means having an upper surface and having opposite ends thereof positioned beneath opposed end portions of the upper deck means, said lower deck means positioned entirely between the beams whereby the conduit of the lower deck means extends substantially parallel to and beneath at least one end portion of the upper deck conduits and spans the distance therebetween;
   (c) support means for supporting the lower deck means between the beams;
   (d) access means between the deck conduits of the upper and lower deck means;
   (e) horizontally disposed feeder means having at least one longitudinally extending feeder conduit therein extending substantially parallel to said beams and having an upper surface, said feeder means positioned entirely above and supported by the upper surface of the lower deck means whereby the upper surface of the feeder means is substantially coplanar with the upper surface of the upper deck means; and
   (f) access means between the conduits of the lower deck means and the feeder means.

2. A cellular flooring system according to claim 1 wherein a layer of concrete is secured over substantially the entire upper surface of the upper deck means and the feeder means, said concrete layer covering substantially the entire floor surface of the flooring system.

3. A cellular flooring system according to claim 2 wherein said layer of concrete has a substantially uniform thickness.

4. A cellular flooring system according to claim 3 wherein said layer has a thickness of at least two inches.

5. A cellular flooring system according to claim 2 wherein said layer of concrete is substantially uninterrupted.

6. A cellular flooring system according to claim 2 wherein said layer of concrete is secured by means of a plurality of studs attached to the beam and extending upwardly into said layer of concrete.

7. A cellular flooring system according to claim 1 wherein said deck conduits and said feeder conduit each have openings therein to allow for vertical communication therebetween while maintaining isolation of services.

8. A cellular flooring system according to claim 1 wherein said upper and lower deck conduits each have openings therein to allow for vertical communication therebetween while maintaining isolation of services.

9. A cellular flooring system according to claim 1 wherein the upper and lower deck means are each composed of at least one corrugated metal sheet presenting a plurality of alternating crests, valleys and inclined webbing portions connecting said crests and valleys.

10. A cellular flooring system according to claim 1 wherein said continuous deck and feeder conduits are each divided into at least two smaller parallel conduits by any suitable separating means.

11. A cellular flooring system according to claim 1 wherein said support means is a longitudinally extending angle member secured to and extending from the webbing portion of the beams.

12. A cellular flooring system according to claim 1 wherein said support means secures the lower deck means directly to the upper deck means.

13. A cellular flooring system according to claim 1 further comprising a layer of fireproofing material provided beneath the feeder means and lower deck means, said layer having substantially the same thickness beneath both the feeder means and the lower deck means.

14. A cellular flooring system according to claim 2 wherein said access means between upper and lower deck conduit means and access means between upper and lower deck conduit means further provide access to the deck and feeder conduits through said layer of concrete.

15. A cellular flooring system according to claim 14 wherein said access means is a housing adapted to receive service fittings and the like.

16. A cellular flooring system according to claim 1 wherein said support means supports the lower deck means between the beams whereby the upper surface of the lower deck means is substantially coplanar with the upper flanges of the beams.

* * * * *